US011124018B1

(12) United States Patent
Brown

(10) Patent No.: US 11,124,018 B1
(45) Date of Patent: Sep. 21, 2021

(54) PAINT STORAGE SYSTEM, DEVICE, AND METHOD FOR STORING PAINT

(71) Applicant: David M. Brown, For Myers, FL (US)

(72) Inventor: David M. Brown, For Myers, FL (US)

(*) Notice: Subject to any disclaimer, the term of this patent is extended or adjusted under 35 U.S.C. 154(b) by 131 days.

(21) Appl. No.: 15/722,130

(22) Filed: Oct. 2, 2017

(51) Int. Cl.
*B65B 9/12* (2006.01)
*B65B 51/30* (2006.01)
*B44D 3/12* (2006.01)
*B65D 75/30* (2006.01)

(52) U.S. Cl.
CPC .............. *B44D 3/12* (2013.01); *B65D 75/30* (2013.01)

(58) Field of Classification Search
None
See application file for complete search history.

(56) References Cited

U.S. PATENT DOCUMENTS

| | | | | |
|---|---|---|---|---|
| 2,377,118 A * | 5/1945 | Weisman | ............... | B65D 75/32 426/82 |
| 2,496,609 A * | 2/1950 | Van Antwerpen | ......................... | B29C 66/81435 53/122 |
| 2,940,230 A * | 6/1960 | Flax | ......................... | B65B 9/12 53/479 |
| 3,184,121 A | 5/1965 | Volckening | | |
| 3,262,244 A * | 7/1966 | Cutler | ....................... | B65B 9/12 53/551 |
| 3,279,150 A * | 10/1966 | Watts, Jr. | ................ | B65B 51/14 53/374.9 |
| 3,381,441 A * | 5/1968 | Condo, Jr. | .......... | B29C 66/8491 53/452 |
| 3,407,969 A * | 10/1968 | Klein | ..................... | B65D 75/32 222/107 |
| 3,719,021 A * | 3/1973 | Rosenberg | .......... | B29C 66/1122 53/551 |
| 4,001,075 A * | 1/1977 | Menzner | .................. | B29C 65/18 156/581 |
| 4,924,659 A * | 5/1990 | Watanabe | ............. | B65B 51/303 53/550 |
| 4,977,724 A | 12/1990 | Kim | | |
| 5,061,755 A | 5/1991 | Kim | | |
| 5,207,049 A * | 5/1993 | Baruffato | ................ | B29C 65/18 156/583.1 |
| D368,428 S | 4/1996 | Croft | | |
| 5,852,920 A * | 12/1998 | Linkiewicz | ............. | B29C 65/18 53/551 |
| 5,950,403 A * | 9/1999 | Yamaguchi | .......... | B41J 2/17503 53/434 |
| 5,974,770 A * | 11/1999 | Kume | ..................... | B65B 51/30 53/373.2 |
| 6,088,994 A * | 7/2000 | Nakagawa | .......... | B29C 66/1122 53/51 |
| 6,178,724 B1 * | 1/2001 | Tobolka | .................. | B29C 65/18 53/451 |

(Continued)

FOREIGN PATENT DOCUMENTS

GB 1012510 A * 12/1965 ........... B65B 9/2049

*Primary Examiner* — Hemant Desai
*Assistant Examiner* — Tanzim Imam
(74) *Attorney, Agent, or Firm* — Bryan L. Loeffler, Esq.; Loeffler IP Group, P.A.

(57) ABSTRACT

A system device and method for storing paint in which paint (2), either at a paint store or at home, is placed in a storage bag (1) that is sealed to create one or more packets (10). The packets may then be stored for use at a later date for touching up damaged or marked paint on walls and other surfaces.

1 Claim, 2 Drawing Sheets

(56) References Cited

U.S. PATENT DOCUMENTS

| | | | |
|---|---|---|---|
| 6,637,177 B1* | 10/2003 | Trillich | B65B 1/28 |
| | | | 53/434 |
| 6,775,962 B1* | 8/2004 | Cosmo | B29C 66/8225 |
| | | | 53/568 |
| 7,241,066 B1 | 7/2007 | Rosen et al. | |
| 7,669,736 B2 | 3/2010 | Harper | |
| 8,232,483 B2* | 7/2012 | Murdter | G01G 19/14 |
| | | | 177/160 |
| 8,376,183 B1 | 2/2013 | Rosen | |
| 8,528,307 B2* | 9/2013 | Thierig | B65B 29/00 |
| | | | 53/469 |
| 9,061,796 B2 | 6/2015 | Caldwell et al. | |
| 2003/0213217 A1* | 11/2003 | Kondo | B29C 66/8223 |
| | | | 53/545 |
| 2004/0011003 A1* | 1/2004 | Sung | B65B 67/04 |
| | | | 53/284.7 |
| 2004/0255560 A1* | 12/2004 | Noble | B29B 7/7678 |
| | | | 53/469 |
| 2005/0172574 A1* | 8/2005 | Paradisi | B29C 65/3656 |
| | | | 53/374.2 |
| 2007/0095023 A1* | 5/2007 | Hanatani | B29C 66/81422 |
| | | | 53/467 |
| 2008/0035516 A1 | 2/2008 | Lombardi et al. | |
| 2009/0013654 A1* | 1/2009 | Talacci | B29C 66/133 |
| | | | 53/548 |
| 2010/0107570 A1* | 5/2010 | Khan | B65B 5/103 |
| | | | 53/479 |
| 2010/0230032 A1* | 9/2010 | Allen | B65B 51/28 |
| | | | 156/78 |
| 2017/0349312 A1* | 12/2017 | Lazor | B65B 9/093 |
| 2018/0162569 A1* | 6/2018 | Day | B65B 25/001 |
| 2018/0170599 A1* | 6/2018 | Bierschenk | B29C 66/8246 |

* cited by examiner

PAINT STORAGE SYSTEM, DEVICE, AND METHOD FOR STORING PAINT

FIELD OF THE INVENTION

This invention relates to devices for storing and dispensing paint, and more particularly, the storage of paint using packets and a device for creating the packets.

BACKGROUND OF THE INVENTION

Paint is a common material used in residential, commercial and industrial settings. It is a common occurrence for a home owner to paint various rooms of a home in different colors. Paint is usually sold in gallon or five gallon containers and the home owner often has left over paint when a job is complete. A home owner will often save the cans of paint for touch-up jobs as the need arises. This has resulted in most homes having a library of paint cans stored in some location, usually in a corner of the basement or a garage, using up valuable storage space.

In addition, the lids on the paint cans often do not provide an airtight seal with the can, thereby allowing leaking air and moisture to enter the can around the seal. This is especially true after the can has been opened and resealed by a homeowner using a hammer or mallet. Even if the seal is airtight air trapped within the can can over time cause the paint to deteriorate. As a result, the paint within the stored paint cans will dry out and/or deteriorate over time thereby causing the color of the paint to change. In either case, the paint becomes unusable for touchups.

Therefore, a need exists for a paint storage system, device and method that allows paint to be stored in airtight packets that preserve the quality of the paint being stored for reuse at a later date and to eliminate the need for storage space for used paint cans.

| The relevant prior art includes the following references: | | |
|---|---|---|
| Pat. No. (U.S. unless stated otherwise) | Inventor | Issue/Publication Date |
| 3,184,121 | Volckening | May 18, 1965 |
| 4,977,724 | Kim | Dec. 18, 1990 |
| 5,061,755 | Kim | May 21, 1991 |
| D368,428 | Croft | Apr. 2, 1996 |
| 7,241,066 | Rosen et al. | Jul. 10, 2007 |
| 2008/0035516 | Lombardi et al. | Feb. 14, 2008 |
| 7,669,736 | Harper | Mar. 2, 2010 |
| 8,376,183 | Rosen | Feb. 19, 2013 |
| 9,061,796 | Caldwell et al. | Jun. 23, 2015 |

SUMMARY OF THE INVENTION

The primary object of the present invention is to provide a paint storage system, devise and method that provides airtight packets that preserve the quality of the paint being stored therein.

An additional object of the present invention is to provide a paint storage system, devise and method that provides one or more packets for storing paint that are single use packets.

An additional object of the present invention is to provide a paint storage system, device and method that provides one or more packets that vary in size so a user can store and then retrieve an adequate amount of paint for a given job.

An additional object of the present invention is to provide a paint storage system, device and method that provides packets that are easily stored without taking up an unnecessary amount of storage space.

The present invention fulfills the above and other objects by providing a system device and method for storing paint in which paint, either at a paint store or at home, is placed in a storage bag that is sealed to create one or more packets. The packets may then be stored for use at a later date for touching up damaged or marked paint on walls and other surfaces.

The system, device and method of the present invention uses a storage bag having a sealed bottom edge, sealed side edges and an open top edge to allow paint to be poured into the bag. The top edge may then be sealed using a heat welding device. Heat welds may also be placed at different intervals, horizontally and/or perpendicularly, across the surface of the storage bag to create a plurality of packets having various sizes.

The packets are preferably created using a heat welding press having two panels pivotally attached to a base, thereby allowing the panels to extend upward and to be angled apart when the heat welding press is in an open position. When the heat welding press is placed in a closed position, inner surfaces of the panels are pressed toward each other so that the panels are parallel to each other creating a clamping pressure on any objects placed between the two panels. At least one horizontal raised ridge extends horizontally across of an inner surface of one of the two panels to create a heat weld. The heat may be created by at least one heating element, which may transmit heat to the at least one raised ridge or may be the raised ridge itself. One or more vertical raised ridges may extend vertically across an inner surface of one of the panels to create a grid pattern with the at least one horizontal raised ridge. The grid pattern allows a user to make multiple packets of varying sizes out of a single storage bag filled with paint.

To create one or more packets, a storage bag is placed in the heat welding press in a vertical position so the opening of the bag is standing straight up. Paint is then poured into the bag. Then, then heat welding press is closed by pushing the two panels together, thereby pushing paint in the bag upward evenly distributing the paint throughout the bag. As the two panels come together, heat welds are placed on the bag horizontally and/or vertically in a grid pattern to create sealed packets containing paint.

The raised horizontal and vertical ridges may be serrated to allow the plurality of packets and to be separated from each other.

In an alternative embodiment, the heat welding press is automated by having one or more rollers that feeds a tubular plastic sleeve through the heat welding press. The sleeve is sealed access the bottom to create a storage bag and is then filled with paint and sealed across the top to create a paint filled packet. A pump tube may be provided to transfer the paint from the paint can into the storage bag. The pump tube may be washed by running water or other fluids through the pump tube after use.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
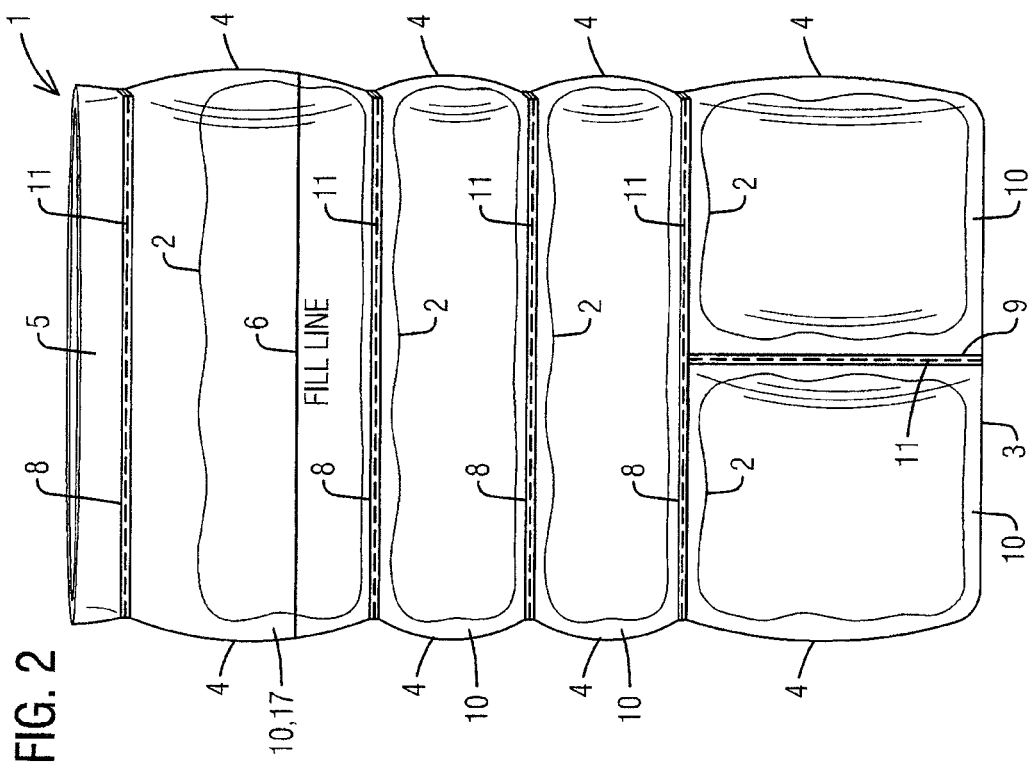
FIG. 1 is a perspective side view of an open storage bag of the present invention.
Figure 2:
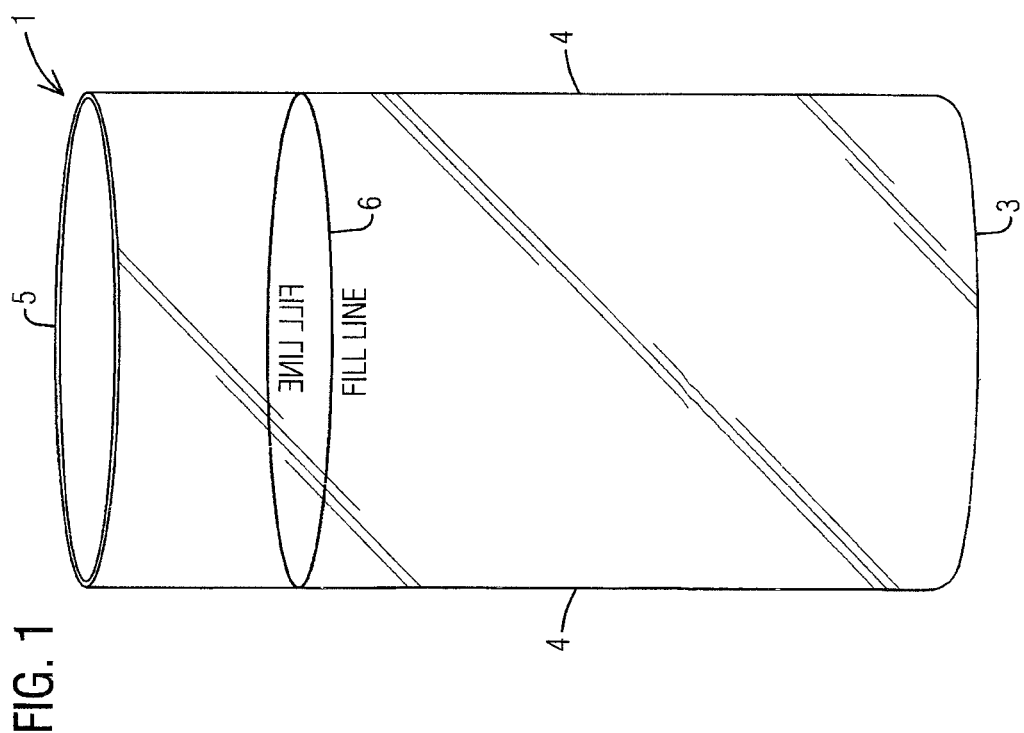
FIG. 2 is a perspective side view of a sealed storage bag of the present invention containing paint.

For purposes of describing the preferred embodiment, the terminology used in reference to the numbered accessories in the drawings is as follows:

1. storage bag
2. paint
3. sealed bottom edge of storage bag
4. sealed side edge of storage bag
5. open top edge of storage bag
6. fill line
7. heat welding press
8. horizontal heat weld
9. vertical heat weld
10. packet
11. perforation
12. panel
13. base
14. inner surface of panel
15. horizontal raised ridge
16. vertical raised ridge
17. overflow packet With reference to FIGS. 1 and 2, a perspective side view of an open storage bag 1 of the present invention and a perspective side view of a sealed storage bag 1 of the present invention containing paint 2, respectively, are illustrated. Said storage bag 1 comprises a sealed bottom edge 3, sealed side edges 4 and an open top edge 5 to allow paint 2 to be poured into the storage bag 1. A fill line 6 or equivalent indicia is used for measuring an amount of paint 2 being poured into the storage bag 1 is preferably printed on the storage bag 1. The fill line 6 prevents an excess amount of paint 2 from being poured into the storage bag 1, thereby preventing paint 2 from overflowing from the storage bag 1 when the storage bag 1 is sealed.

Figure 4:
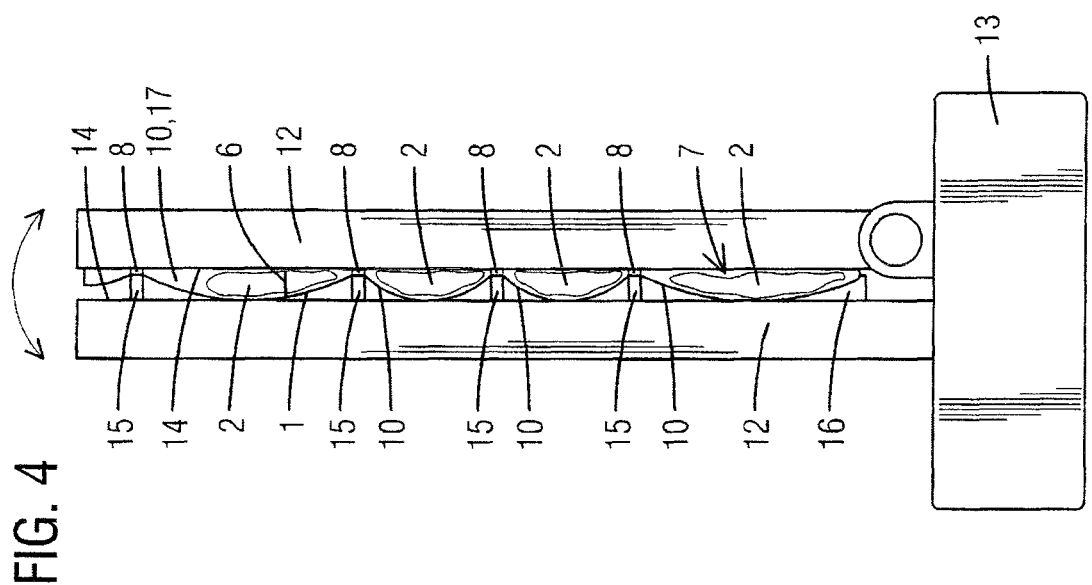
FIG. 4 is a perspective side view of a heat welding press of the present invention in a closed position with a storage bag contained therein.
Figure 3:
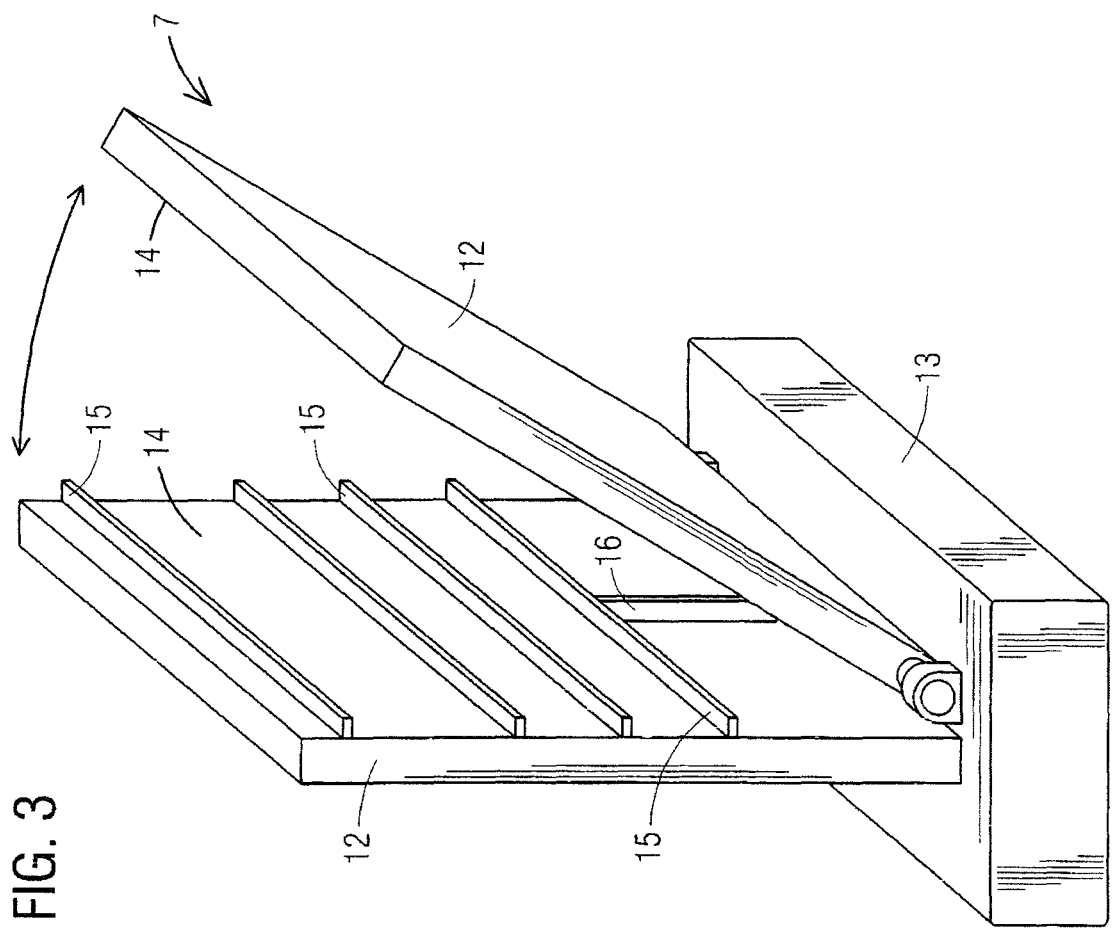
FIG. 3 is a perspective side view of a heat welding press of the present invention in an open position.

The open top edge 5 may then be sealed using a heat welding press 7, as illustrated in FIGS. 3 and 4, wherein at least one horizontal heat weld 8 is placed horizontally across the storage bag 1 parallel to the open top edge 5 to create at least one sealed packet 10 having paint 2 contained therein. One or more vertical heat welds 9 may also be placed vertically across the storage bag 1 to parallel to the side edges 4 to create a plurality of packets 10 having various sizes and amounts of paint 2 stored therein. Perforations 11 may be located along the horizontal heat welds 8 and/or vertical heat welds 9 to allow the plurality of packets 10 to be easily separated from each other.

With reference to FIGS. 3 and 4, a perspective side view of a heat welding press 7 of the present invention in an open position and a perspective side view of a heat welding press 7 of the present invention in a closed position with a storage bag 1 contained therein, respectively, are illustrated. One or more paint 2 containing packets 10 are created using a storage bag 1 of the present invention and a heat welding press 7 to seal the storage bag 1 by placing one or more horizontal heat welds 8 and, if desired, one or more vertical heat welds 9. The heat welding press 7 comprises two panels 12, at least one of which is pivotally attached to a base 13, thereby allowing the panels 12 to extend upward and to be angled apart when the heat welding press 7 is in an open position, as illustrated in FIG. 3. When the heat welding press 7 is placed in a closed position, as illustrated in FIG. 4, inner surfaces 14 of the panels 12 are pressed toward each other so that the panels 12 are substantially parallel to each other, thereby creating a clamping pressure on any objects placed between the two panels 12. At least one heat transmitting horizontal raised ridge 15 extends horizontally across of an inner surface 14 of one of the two panels 12 to create at least one horizontal heat weld 8 on a storage bag 1. At least one heat transmitting vertical raised ridge 16 may extend vertically across an inner surface 14 of one of the two panels 12 to create at least one vertical heat weld 9 and a grid pattern with the at least one horizontal raised ridge 15. The grid pattern allows a user to make multiple paint containing packets 10 of varying sizes out of a single storage bag 1 filled with paint 2, as illustrated in FIG. 2.

To create one or more packets 10, a storage bag 1 is placed in the heat welding press 7 in a vertical position so the open top edge 5 is standing straight up. Paint 2 is then poured into the storage bag 1. Then, then heat welding press 7 is closed by pushing the two panels 12 together, thereby squeezing paint 2 in the storage bag 1 upward and evenly distributing the paint 2 throughout the storage bag 1. As the two panels 12 come together, one or more horizontal heat welds 8 and/or vertical heat welds 9 are created on the storage bag 1 to form one or more sealed packets 10 containing paint 2. Excess paint 2 may be pushed into an overflow packet 17 that is sealed to prevent excess paint 2 from escaping the storage bag 1 while being sealed, as illustrated in FIG. 2. The overflow packet 17 may then be saved or removed and discarded as desired.

The at least one horizontal raised ridge 15 and the at least one vertical raised ridge 15 may be serrated to allow the horizontal heat welds 8 and/or vertical heat welds 9 to be perforated, thereby allowing the plurality of packets 10 and to be easily separated from each other.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A method for storing paint, said method comprising the steps of:
   filling a storage bag with a predetermined amount of paint, wherein said storage bag has a previously sealed bottom edge, sealed side edges and an open top edge;
   placing said storage bag filled with paint in an upright position in a heat welding press when the heat welding press is in an open position,
   said heat welding press having two panels oriented in facing positions, wherein at least one of the two panels is pivotally attached to the heat welding press, thereby allowing top edges of the two panels to be angled apart into the open position for accepting said storage bag filled with paint,
   at least two heat transmitting horizontal raised ridges extending horizontally across an inner surface of one of the two panels of the heat welding press, said at least two heat transmitting horizontal raised ridges extending outward from the inner surface of said one of the two panels of the heat welding press, said at least two heat transmitting horizontal raised ridges being spaced apart from each other on the inner surface of said one of the two panels of the heat welding press to create a void between the at least two heat transmitting horizontal raised ridges on the inner surface of said one of the two panels of the heat welding press; and placing said two panels into a closed position with said storage bag fully inserted between said two panels, a portion of said storage bag being within said void created by said at least two heat transmitting horizontal raised ridges, wherein placing said two panels into the closed position creates at least two horizontal heat welds on said storage bag above said previously sealed bottom edge using said at least two heat transmitting horizontal raised ridges extending horizontally across the inner surface of the one of the two panels to seal said paint in said storage bag and to simultaneously divide the storage bag into multiple completely sealed packets, each completely sealed packet being filled with a portion of the paint.

* * * * *